United States Patent [19]
Longardner et al.

[11] Patent Number: 6,082,094
[45] Date of Patent: Jul. 4, 2000

[54] VENTILATION SYSTEM FOR ACOUSTIC ENCLOSURES FOR COMBUSTION TURBINES AND AIR BREATHING HEAT ENGINES

[76] Inventors: Robert L. Longardner, 5321 Radnor Rd., Indianapolis, Ind. 46226; William J. Longardner, 12615 Bay Run Cir., Indianapolis, Ind. 46236

[21] Appl. No.: 09/102,426

[22] Filed: Jun. 22, 1998

Related U.S. Application Data

[60] Provisional application No. 60/050,486, Jun. 23, 1997.

[51] Int. Cl.$^7$ ........................................ F02G 1/00
[52] U.S. Cl. ........................ 60/39.33; 62/238.3; 290/52
[58] Field of Search .................... 60/39.33, 725, 60/728; 62/238.3, 238.6; 290/52

[56] References Cited

U.S. PATENT DOCUMENTS

| | | | |
|---|---|---|---|
| 4,002,023 | 1/1977 | Hartmann | 60/39.33 |
| 4,275,310 | 6/1981 | Summers et al. | 290/1 R |
| 4,849,648 | 7/1989 | Longardner | 290/54 |
| 4,936,109 | 6/1990 | Longardner | 62/238.3 |
| 5,284,012 | 2/1994 | Laborie et al. | 60/39.33 |
| 5,649,418 | 7/1997 | Ludwig | 60/39.33 |
| 5,655,373 | 8/1997 | Yamashita et al. | 60/728 |

*Primary Examiner*—Charles G. Freay
*Attorney, Agent, or Firm*—Baker & Daniels

[57] ABSTRACT

A ventilating system for adjusting temperature within acoustic enclosures for combustion turbines and other engines. The ventilating system includes a duct in flow communication with an inlet opening of the acoustic enclosure. A heat exchanger connected to a source of coolant, such as an absorption refrigeration system, is installed in the ventilating duct and changes the temperature of air passing through the ventilating duct. A blower causes air within the ventilating duct to pass over the heat exchanger and then into the enclosure through its inlet opening. As the air continues to pass through the enclosure and out of an enclosure outlet opening, the temperature within the enclosure around the engine is adjusted.

16 Claims, 1 Drawing Sheet

VENTILATION SYSTEM FOR ACOUSTIC ENCLOSURES FOR COMBUSTION TURBINES AND AIR BREATHING HEAT ENGINES

CROSS-REFERENCE TO RELATED APPLICATION

This application claims the benefit under 35 U.S.C. § 119(e) of U.S. Provisional Application No. 60/050,486, filed Jun. 23, 1997.

BACKGROUND OF THE INVENTION

The present invention pertains to air breathing heat engines such as combustion turbines, and, in particular, to a system for cooling the acoustic enclosure or housing for the heat engine.

The aero-derivative and framed combustion turbine (CTs) are rapidly becoming the power generator of choice. Earlier applications of CTs were configured to meet spikes in energy dispatch and with very little regard for heat rates. Due to many favorable features of CTs such as their being relatively environmental friendly, as well as their improvement in heat rates and reduced capital costs, CTs are increasingly being employed in intermediate and base load generation and now likely will be the wave of the foreseeable future.

In a stationary power generation mode, CT housings or enclosures are designed to absorb sound energy achieving free-field noise emissions levels not exceeding 63 decibels at 200 feet and to provide for weather protection. These enclosures are structured around the power take-offs, hot section of the turbine, combustors, and the compressors. These engine components within the enclosure radiate, convect, and conduct heat at the rate of the thermal loss expressed as the over-all energy transformation efficiencies which can be calculated:

(output/input)×100=thermal efficiencies

Typical CT thermal efficiency are such that they radiate 25–35% of the heating value of the fuel burned which is conducted and convected into the acoustic enclosure.

One problem with existing acoustic enclosures is their tendency to retain the heat being produced by the engine components. In particular, all things being equal, turbines surrounded by high temperature air operate less efficiently than turbines surrounded by cooler air. Although some of the heat produced in energy transformation by the turbine is removed by oil cooling systems and engine exhausts, an appreciable amount of heat is transferred to the enclosure and the air contained therein. This transferred heat causes the air in the enclosure to increase in temperature, which tends to adversely affect turbine efficiency.

To offset the radiated energy from the operating turbine which is conducted from the turbine case and power take-off to the entrapment within the enclosure, ambient filtered air at a rate between 10–20 cfm per kilowatt of the turbine has previously been forcibly vented by blowers through the enclosure as a coolant. However, the cooling capabilities of such a configuration is less than desired.

Thus, it would be desirable to provide a better cooling system for the interior volume of an acoustic enclosure to further enhance combustion turbine efficiency.

SUMMARY OF THE INVENTION

The present invention provides a ventilating system for an acoustic enclosure that utilizes a vapor condensing heat exchanger within an air duct ported into the interior of the acoustic enclosure to sensibly cool the ventilating air and thereby the enclosure. The vapor condensing heat exchanger conditions air being vented through the enclosure to improve the operating efficiency of a combustion turbine or air breathing heat engine within the enclosure.

In one form thereof, the present invention provides a system for adjusting temperature external to an engine, including an enclosure defining an interior volume in which is positioned at least a portion of the engine, a ventilating duct in flow communication with an inlet opening of the enclosure, a heat exchanger installed in the ventilating duct and adapted to change a temperature of air passing through the ventilating duct, and at least one blower for causing air from an air source to pass through the ventilating duct into the enclosure through the inlet opening, and through the enclosure and out of its outlet opening, whereby a temperature within the enclosure around the engine is altered by the air passing through the enclosure.

In another form thereof, the present invention provides a power generation system including an air breathing heat engine, an intake duct for delivering air to an inlet of the engine, an outlet duct for exhausting combustion gases from an outlet of the engine, and an acoustic enclosure for dampening engine generated noise. The acoustic enclosure includes an air inlet opening for introduction of cooling air and an air outlet opening for exhausting air, and the engine is positioned within an interior volume of the enclosure. The system also includes a ventilating duct in flow communication with the air inlet opening of the enclosure, and a heat exchanger connected to a source of chillant. The heat exchanger is positioned within the ventilating duct for cooling the air flowing through the ventilating duct and into the enclosure through the air inlet opening.

One advantage of the present invention is that a ventilating system for the acoustic enclosure of a combustion turbine is provided that cools the contents of the enclosure to improve the efficiency of a heat engine housed therein.

Another advantage of the present invention is that a ventilating system is provided which utilizes energy already being produced by operation of the heat engine so as to be non-parasitic and to not require the input of further energy from outside sources.

BRIEF DESCRIPTION OF THE DRAWING

The above mentioned and other advantages and objects of this invention, and the manner of attaining them, will become more apparent and the invention itself will be better understood by reference to the following description of an embodiment of the invention taken in conjunction with the accompanying drawing, wherein.

Figure 1:
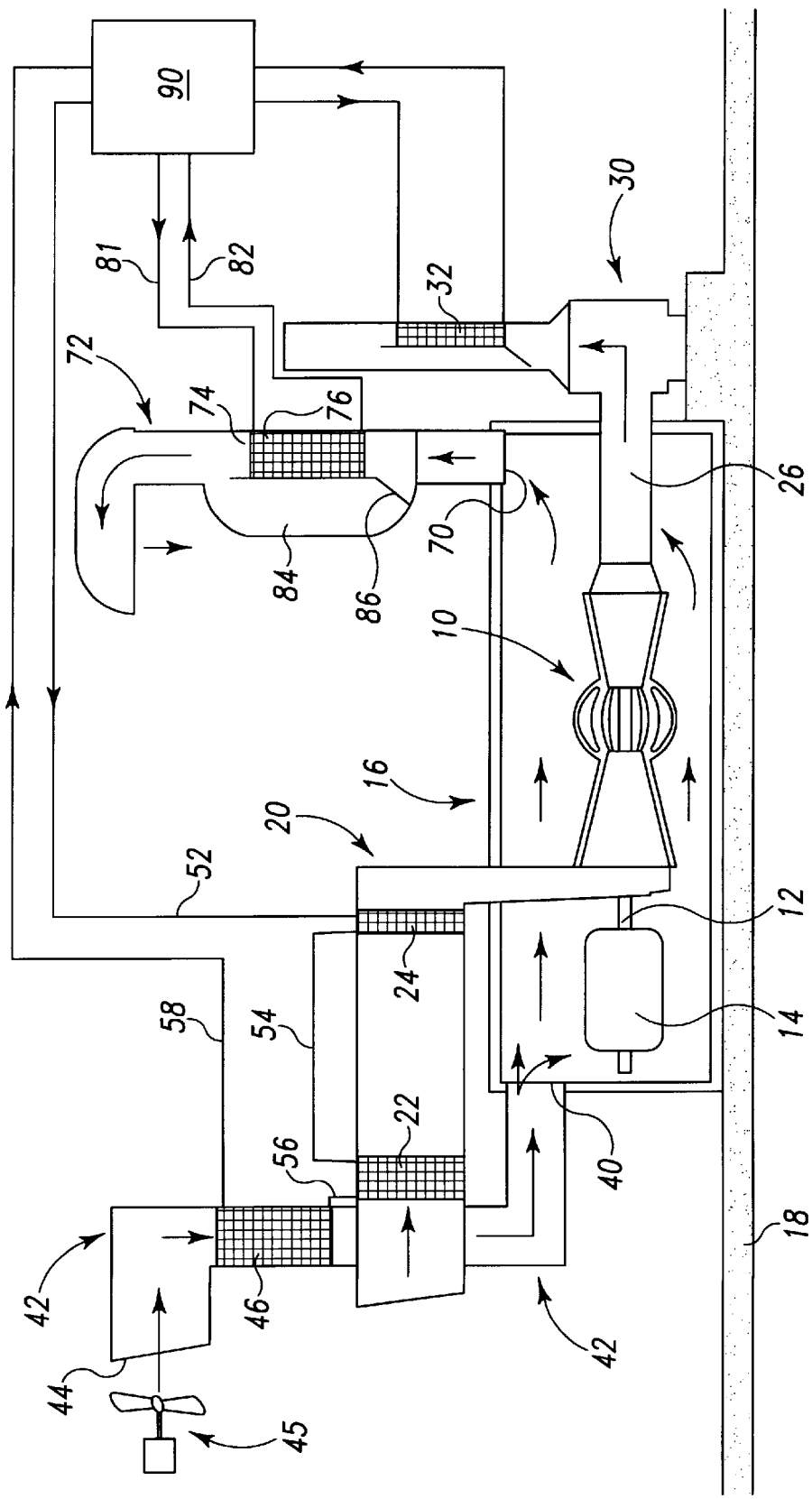
FIG. 1 is a diagrammatic front view of a first embodiment of a ventilating system for the housing of a combustion turbine configured according to the principles of the present invention.

Although the drawing represents an embodiment of the invention, the drawing is not necessarily to scale and certain features may be exaggerated or omitted in order to better illustrate and explain the present invention.

DESCRIPTION OF THE PREFERRED EMBODIMENT

Referring now to FIG. 1, there is diagrammatically shown a front view of a first embodiment of a ventilation system for a combustion turbine housing configured according to the present invention. The overall configuration of the components, such as the size and shape of the intake and exhaust air ducts of the ventilating system, may be reconfigured by one of skill in the art, and therefore the arrangement shown in FIG. 1 is representative and not intended to be limiting. In addition, although shown and described with respect to cooling the acoustic enclosure for an aero-derivative and framed combustion turbine, the inventive ventilating system may be employed with other air breathing heat engine configurations, such as prime mover reciprocating engines.

A combustion turbine is abstractly shown at 10, and as is conventional with gas turbines, includes a compressor, a combustor and a turbine which utilizes the gases from the combustor to drive the shaft indicated at 12. Shaft 12 is drivingly connected to a generator 14 for power generation. Turbine 10 operates in the stationary mode in that, unlike the aero-related turbines on which its design is based that naturally moved while used in flight, the turbine is fixedly mounted to a support surface or ground during use.

Turbine 10 and generator 14 are housed within a substantially air-tight acoustic enclosure, generally indicated at 16, mounted on support surface 18. Although shown as a parallelepiped in shape, acoustic enclosure 16 may be otherwise shaped within the scope of the present invention. Acoustic enclosure is designed to dampen noises produced by turbine 10, as well as to protect the turbine from exposure to, for example, the elements.

An intake air duct 20 ports into the interior of acoustic enclosure 16 and supplies air to the compressor of turbine 10. Ambient air inlet into duct 20 passes sequentially through vapor condensing heat exchanger 22 and sensible cooling heat exchanger 24 to be conditioned prior to entering the turbine compressor.

The turbine exhaust is ported through housing 16 via conduit 26 to a waste heat recovery unit and stack exhaust system generally designated 30 that exhausts to atmosphere. A heat exchanger 32 positioned within a flue of the exhaust stack is used to draw heat off of the combustion gases being exhausted in order to power an absorption refrigeration unit, which is abstractly shown at 90, that supplies chillant to the heat exchangers 22 and 24.

At one end of acoustic enclosure 16, formed into the enclosure is an inlet opening 40 which is in air flow communication with the downstream end of an intake air duct or shaft generally designated 42. Intake air duct 42 includes an inlet end 44 that opens to atmosphere. Fans or blowers abstractly shown at 45 are provided to force air into inlet end 44 and through the ventilation intake air duct 42, enclosure 16, and the ventilation exhaust duct. Blowers 45 alternatively may be provided at other points along the ventilation system, including such as within the ventilation exhaust duct, to force or draw air through the system. Air entering duct 42 through inlet end 44 passes through a not shown filter and through a vapor condensing heat exchanger generally shown at 46 mounted within the intake duct interior. Although shown closer to inlet end 44 than acoustic enclosure 16, heat exchanger 46 may be alternatively positioned along the length of intake duct 42, such as closer to or immediately adjacent inlet opening 40 within the scope of the present invention.

Vapor condensing heat exchanger 46 may be of conventional design including a cooling coil over which air flows and which provides a circuitous path for relatively low temperature chillant being carried therethrough. Cooling coil 46 may be provided by cooling coil tube sections that are arranged in rows and columns in the air duct and that are oriented to be generally transverse to the flow of ambient air being conveyed through the duct. The cooling coil tube sections may be arranged, for example, to extend horizontally and with spacing between the cooling coil tube sections to provide a large surface area for contact with passing air. While single inlet and outlet chillant lines for heat exchanger 46 are shown, multiple inlet lines and outlet lines may be used and separately circuited to the coil tube sections within the scope of the present invention.

Vapor condensing heat exchanger 46 removes the heat from the airstream by firstly condensing the vapor (rejecting 970 Btu per pound of water) followed by a sensible cooling of the remainder of the vapor air mixture. It will be appreciated that this conditioning of the air results in better acoustic enclosure cooling capabilities of the ventilation system.

By conditioning the air to a relatively low dry bulb and wet bulb temperature, the enclosure is better cooled, and the efficiency of combustion turbine 10 is improved. By way of example to illustrate the benefits of cooler air, the specific heat in comparable air mixtures is 20.16 Btu/ft$^3$ when at 55° F. @ 80% Relative Humidity (R.H.) and 54.74 Btu/ft$^3$ when at 95° F. @ 80% R.H. These numbers evidence that an air mixture of 55° F. @ 80% R.H. would have a cooling advantage of 34.58 Btu/ft$^3$ over the air mixture at 95° F. @ 80% R.H.

Vapor condensing heat exchanger 46 is preferably sized and arranged to condition the intake air flowing through air duct 42 such that air exiting heat exchanger 46 is cooled to between approximately 45° F. and 50° F., and preferably 45° F., and to one hundred percent relative humidity. Heat exchanger 46 may be configured to condition air to different air temperatures, including temperatures higher than these preferred values, provided such conditioned air temperatures are satisfactory to achieve suitable acoustic enclosure cooling; the same configuration can be used to heat the enclosure.

Vapor condensing heat exchanger 46 is shown in FIG. 1 being supplied with chillate that has already been circulated through heat exchangers 22 and 24 in air duct 20. In particular, the exchangers may be plumbed in series such that chillate, for example water at 42° F., is introduced to the inlet of heat exchanger 24 through a thermally insulated conduit 52 from absorption refrigeration system 90, passes from heat exchanger 24 to heat exchanger 22 through thermally insulated conduit 54, passes from heat exchanger 22 to vapor condensing heat exchanger 46 through thermally insulated conduit 56, and is returned at a higher temperature from heat exchanger 46 to refrigeration system 90 through thermally insulated conduit 58. In order to ensure the chillate delivered to heat exchanger 46 is adequately cold to suitably cool the ventilating air, in an alternate embodiment, chillate at between 42–44° F. may be provided directly from the refrigeration system to heat exchanger 46. For example, the heat exchangers 46, 22 and 24 may be plumbed in parallel.

The chillate may be provided by, and the conduits 52 and 58 may be connected to, an absorption refrigeration system of the type described in U.S. Pat. No. 4,936,109, which is incorporated fully herein by reference. This type of system, from an energy standpoint, is non-parasitic. Other refrigeration processes which are known in the art may be used to provide chillate to the heat exchangers within the scope of the invention. For example, the chillant may be produced using a conventional vapor-compression refrigerator that may be, for example, powered by an external power source of conventional design so as to be an energy parasitic system.

Proximate the end of acoustic enclosure 16 opposite the end in which ventilating air is introduced into the interior of enclosure 16, outlet opening 70 is formed into the top wall of enclosure 16. A ventilation exhaust duct or stack 72 is in air flow communication with the interior of enclosure 16 via outlet opening 70. Air forced through ventilation intake duct 42 and the interior of enclosure 16 passes through exhaust duct 72 to atmosphere as shown.

Exhaust duct 72 includes a flue portion 74 equipped with a heat exchanger 76. Heat exchanger 76, which may configured similarly to heat exchanger 46 and include multiple, spaced, fluidly interconnected tube sections arranged transversely to the air flowing through the exhaust duct, serves to draw heat off of the ventilating air in order to power absorption refrigeration unit 90 that supplies chillant to heat exchanger 46.

In particular, the high temperatures experienced by turbine 10, which may reach up to between about 2000° F. and 3500° F., results in high temperature ventilation exhaust gases flowing through duct 72. Ventilation exhaust gases typically expelled from enclosure 16 through duct 72 have temperatures ranging from 200° F. to 700° F. Heat exchanger 76 is connected with absorption refrigeration system 90 via thermally insulated conduits 81 and 82 that route high temperature water or steam, such as at around 195° F., through the heat exchanger coil to draw off the heat from the ventilation exhaust.

Exhaust stack 72 is also abstractly shown as including a bypass flue portion 84 which can be opened and closed by a diverter valve 86. This design allows modulation, as controlled by the refrigeration system, of the production of high temperature water or steam.

Although not shown, the ventilation ducts, and in particular the air intake duct 42, may be equipped with a stop valve to selectively open and close off the ventilating system from the ambient air. For example, in cold weather, it is desirable to prevent an influx of cold air through duct 42 and into enclosure 16 when the system is initially started.

Although not shown, automatic controls for the ducts and the heat exchanger, with appropriate sensors, may be provided in the shown ventilating system to insure the acoustic enclosure 16 is properly ventilated with cooled air from heat exchanger 46.

It will be appreciated that the inventive ventilating system, due to the improved cooling of the interior volume of the acoustic enclosure 16, will reduce the severity of creep in the engine components and will improve CT aspects and the turbine efficiency.

While this invention has been shown and described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A system for adjusting temperature external to an engine, comprising:
    an enclosure defining an interior volume in which is positioned at least a portion of the engine, said enclosure including an inlet opening and an outlet opening;
    a ventilating duct in flow communication with said inlet opening;
    a heat exchanger installed in said ventilating duct and adapted to change a temperature of air passing through said ventilating duct; and
    at least one blower for causing air from an air source to pass through said ventilating duct into said enclosure through said inlet opening, and through said enclosure and out of said enclosure through said outlet opening;
    whereby a temperature within said enclosure around the engine is altered by the air passing through said enclosure.

2. The system of claim 1 wherein said heat exchanger is in flow communication with a coolant source providing coolant to said heat exchanger at a lower temperature than the temperature of air passing through said ventilating duct over said heat exchanger, and wherein said heat exchanger comprises a vapor condensing and sensible cooling heat exchanger.

3. The system of claim 2 wherein air within said ventilating duct immediately downstream of said heat exchanger is at a temperature between about 45° F. and 50° F.

4. The system of claim 2 further comprising a second heat exchanger and an exhaust duct in flow communication with said outlet opening, said second heat exchanger installed within said exhaust duct for drawing heat from air exhausted from said enclosure through said exhaust duct.

5. The system of claim 4 further comprising a diverter valve and a heat exchanger bypass flue within said exhaust duct, said diverter valve operable to close off from air flow a duct portion in which said second heat exchanger is installed and to cause air in said exhaust duct to pass through said heat exchanger bypass flue.

6. The system of claim 4 wherein said heat exchanger installed in said ventilating duct and said second heat exchanger are connected to an absorption refrigeration system, and wherein heat drawn from exhaust air by said second heat exchanger is used by said absorption refrigeration system to cool the coolant delivered to said heat exchanger installed in said ventilating duct.

7. The system of claim 1 wherein said enclosure comprises a substantially airtight acoustic enclosure for dampening noises created by the engine.

8. A power generation system comprising:
    an air breathing heat engine;
    an intake duct for delivering air to an inlet of said engine;
    an outlet duct for exhausting combustion gases from an outlet of said engine;
    an acoustic enclosure for dampening engine generated noise, said acoustic enclosure comprising an air inlet opening for introduction of cooling air and an air outlet opening for exhausting air, wherein said engine is positioned within an interior volume of said enclosure;
    a ventilating duct in flow communication with said air inlet opening of said enclosure; and
    a heat exchanger connected to a source of coolant, said heat exchanger positioned within said ventilating duct for cooling air flowing through said ventilating duct and into said enclosure through said air inlet opening.

9. The power generation system of claim 8 wherein said heat exchanger is adapted to condense vapor and sensibly cool air flowing through said ventilating duct.

10. The power generation system of claim 9 wherein the air within said ventilating duct comprises a temperature between about 45° F. and 50° F. immediately after passing over said heat exchanger in heat exchanging relationship therewith.

11. The power generation system of claim 8 wherein an absorption refrigeration system comprises the source of coolant.

12. The power generation system of claim 11 further comprising an air exhaust duct connected to said air outlet opening of said enclosure, and a second heat exchanger positioned within said air exhaust duct and adapted to draw heat from air passing through said air exhaust duct, said second heat exchanger circuited with said absorption refrigeration system to power cooling of the coolant.

13. The power generation system of claim 12 further comprising a diverter valve and a heat exchanger bypass flue within said air exhaust duct, said diverter valve operable to close off from air flow a duct portion in which said second heat exchanger is installed and to cause air in said air exhaust duct to pass through said heat exchanger bypass flue.

14. The power generation system of claim 8 further comprising at least one heat exchanger positioned in said intake duct, and wherein said at least one heat exchanger and said heat exchanger in said ventilating duct are circuited in series such that common chillant passes therethrough.

15. The power generation system of claim 8 wherein said acoustic enclosure is substantially airtight.

16. The power generation system of claim 8 wherein said engine comprises a combustion turbine.

* * * * *